(12) United States Patent
Nakamura et al.

(10) Patent No.: US 12,541,049 B2
(45) Date of Patent: Feb. 3, 2026

(54) OPTICAL LAYERED BODY INCLUDING COVER SHEETS, PRESSURE-SENSITIVE ADHESIVE LAYERS, AND LIGHT EXTRACTION LAYER

(71) Applicant: NITTO DENKO CORPORATION, Osaka (JP)

(72) Inventors: Kozo Nakamura, Ibaraki (JP); Shimpei Mukadeyama, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/727,196

(22) PCT Filed: Feb. 14, 2023

(86) PCT No.: PCT/JP2023/004926
§ 371 (c)(1),
(2) Date: Jan. 3, 2025

(87) PCT Pub. No.: WO2023/181709
PCT Pub. Date: Sep. 28, 2023

(65) Prior Publication Data
US 2025/0123437 A1    Apr. 17, 2025

(30) Foreign Application Priority Data
Mar. 25, 2022  (JP) ................ 2022-050023

(51) Int. Cl.
*F21V 8/00* (2006.01)
*B32B 3/30* (2006.01)
(Continued)

(52) U.S. Cl.
CPC .............. *G02B 6/0036* (2013.01); *B32B 3/30* (2013.01); *B32B 7/023* (2019.01); *B32B 7/12* (2013.01);
(Continued)

(58) Field of Classification Search
CPC .......................... G02B 6/0036; G02B 6/0041
See application file for complete search history.

(56) References Cited

U.S. PATENT DOCUMENTS 9,110,200 B2 * 8/2015 Nichol ................... G02B 6/006
11,249,238 B2   2/2022 Rinko et al.
(Continued)

FOREIGN PATENT DOCUMENTS

JP    2012-149440    8/2012
JP    2016-167067    9/2016
(Continued)

OTHER PUBLICATIONS

International Search Report issued in International Patent Application No. PCT/JP2023/004926, dated Apr. 25, 2023.

*Primary Examiner* — Keith G. Delahoussaye
(74) *Attorney, Agent, or Firm* — GREENBLUM & BERNSTEIN, P.L.C.

(57) ABSTRACT

An optical laminate includes: a light extraction layer having a first main surface and a second main surface, and having a light extraction mechanism including a recessed portion arranged on any one of the first main surface or the second main surface; a first cover sheet laminated via a first pressure-sensitive adhesive layer on a main surface side of the light extraction layer on which the light extraction mechanism is arranged; and a second cover sheet laminated via a second pressure-sensitive adhesive layer on a main surface side of the light extraction layer on which the light extraction mechanism is prevented from being arranged. The optical laminate has a region having a refractive index lower than a refractive index of the first pressure-sensitive adhesive layer or the second pressure-sensitive adhesive layer arranged on any one of a first or a second main surface side of the light extraction layer.

14 Claims, 8 Drawing Sheets

(51) Int. Cl.
  *B32B 7/023* (2019.01)
  *B32B 7/12* (2006.01)
  *B32B 27/36* (2006.01)
(52) U.S. Cl.
  CPC ............ *B32B 27/36* (2013.01); *G02B 6/0041* (2013.01); *G02B 6/0065* (2013.01); *G02B 6/0076* (2013.01); *G02B 6/0095* (2013.01); *B32B 2307/418* (2013.01); *B32B 2307/42* (2013.01)

(56) References Cited

U.S. PATENT DOCUMENTS

| | | |
|---|---|---|
| 11,391,880 B2 | 7/2022 | Rinko et al. |
| 11,402,563 B2 | 8/2022 | Rinko |
| 11,442,214 B2 | 9/2022 | Rinko |
| 11,536,896 B2 | 12/2022 | Rinko |
| 11,733,447 B2 | 8/2023 | Rinko et al. |
| 2014/0049983 A1* | 2/2014 | Nichol ................. G02B 6/0028 362/610 |
| 2016/0139324 A1 | 5/2016 | Yagi et al. |
| 2018/0335559 A1 | 11/2018 | Cho |
| 2020/0257044 A1 | 8/2020 | Rinko |
| 2021/0003766 A1 | 1/2021 | Rinko |
| 2021/0011211 A1 | 1/2021 | Rinko |
| 2021/0026086 A1 | 1/2021 | Rinko et al. |
| 2021/0048575 A1 | 2/2021 | Rinko et al. |
| 2021/0109274 A1 | 4/2021 | Rinko et al. |
| 2022/0035090 A1 | 2/2022 | Rinko et al. |
| 2023/0077627 A1 | 3/2023 | Rinko |

FOREIGN PATENT DOCUMENTS

| | | |
|---|---|---|
| JP | 2017-68108 | 4/2017 |
| JP | 2018-184831 | 11/2018 |
| JP | 2019-33039 | 2/2019 |
| JP | 2019-530967 | 10/2019 |
| JP | 2020-155251 | 9/2020 |
| JP | 2020-155371 | 9/2020 |
| WO | 2014/203850 | 12/2014 |
| WO | 2019/182091 | 9/2019 |

* cited by examiner

[FIG. 1]
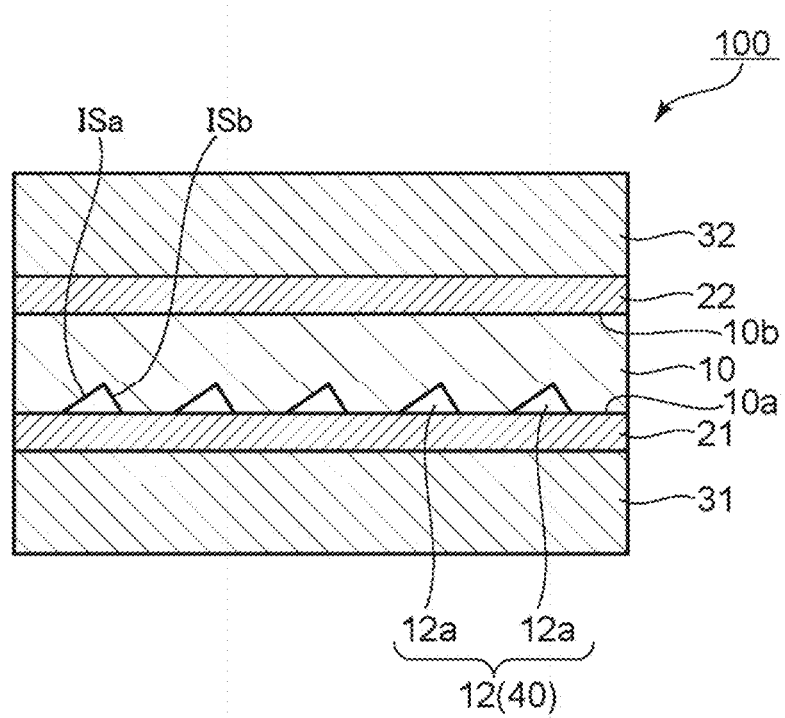

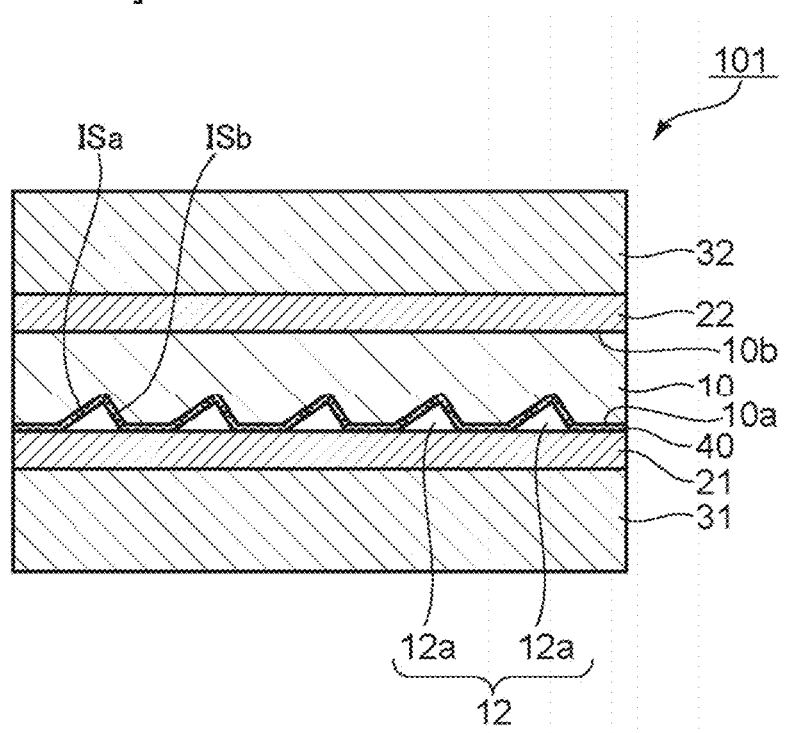
[FIG. 2]

[FIG. 3]
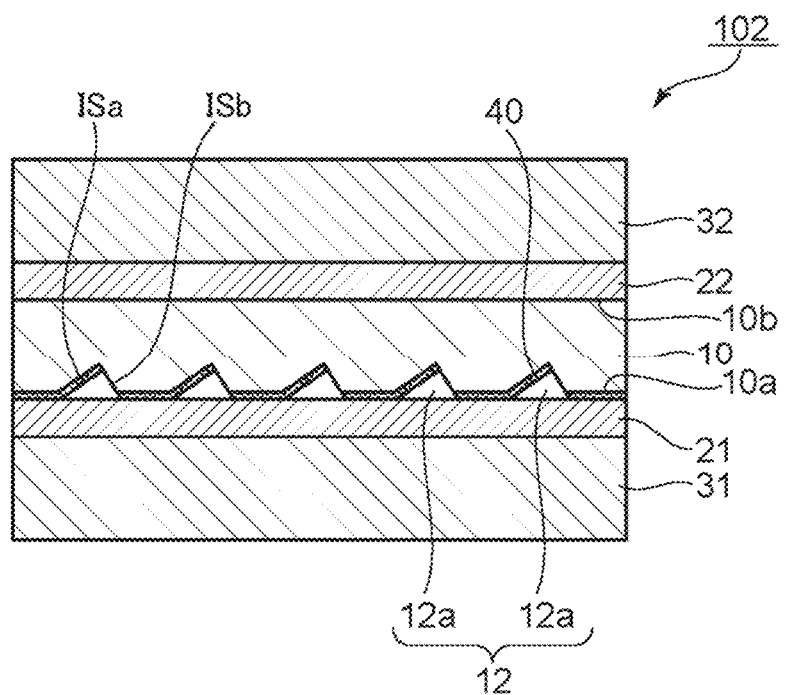

[FIG. 4]
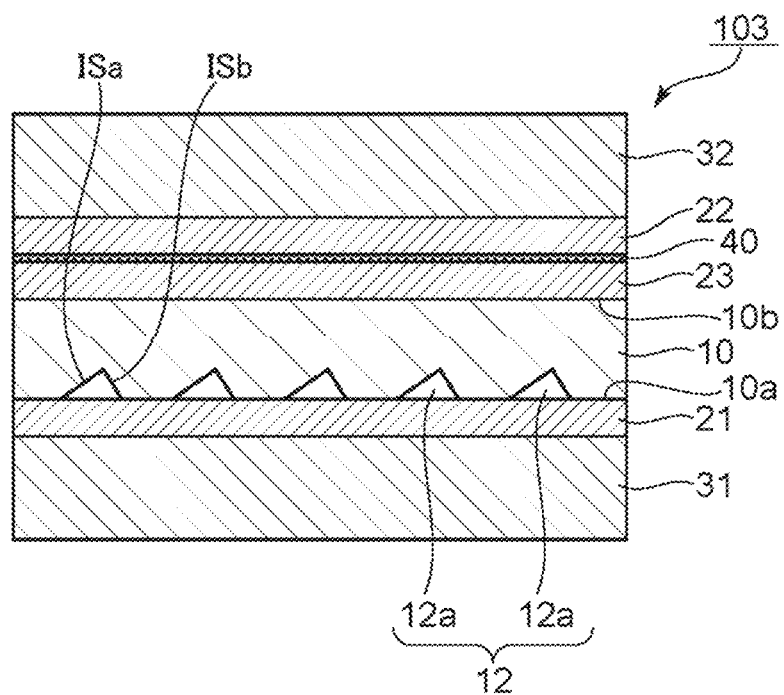

[FIG. 5]
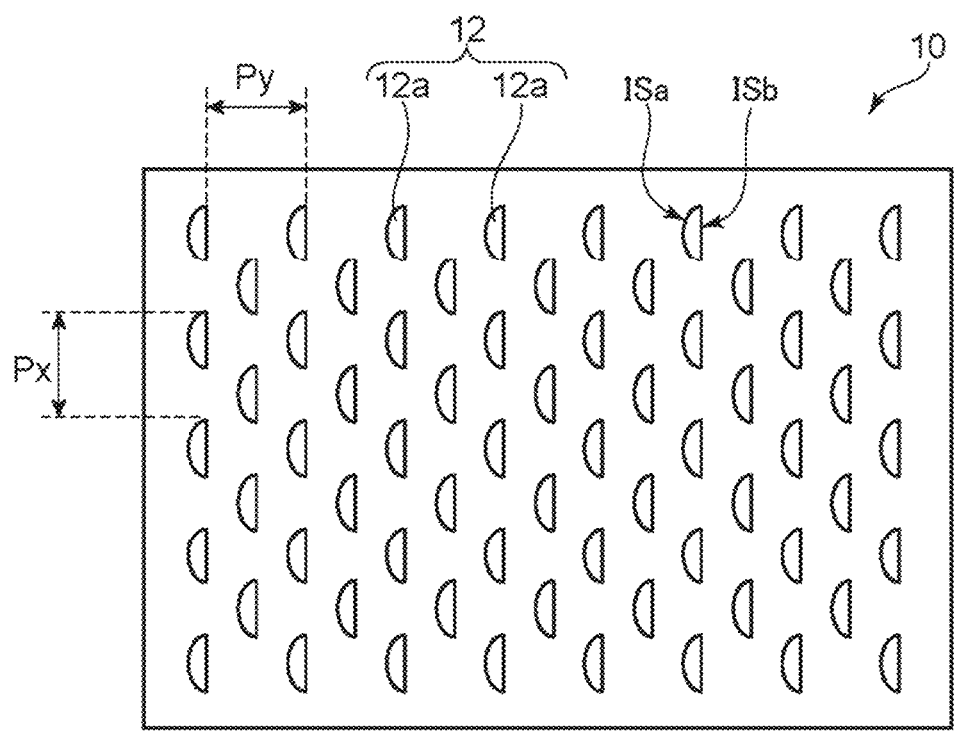

[FIG. 6]
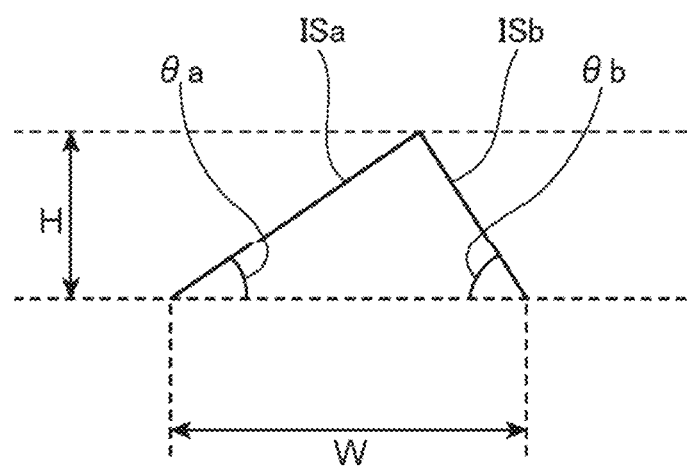
[FIG. 7]
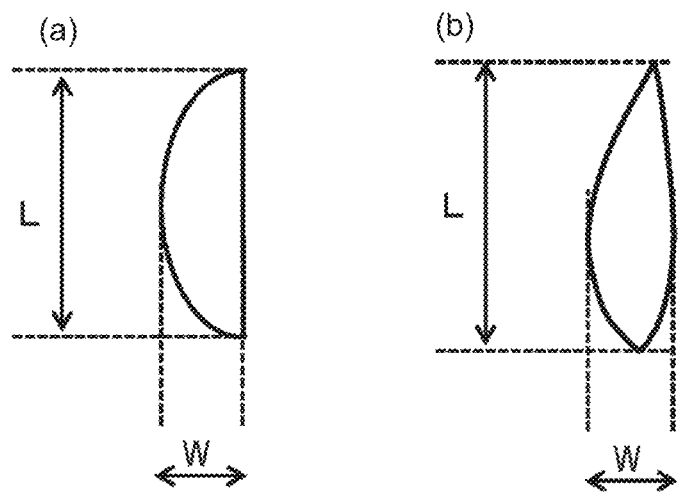

[FIG. 8]
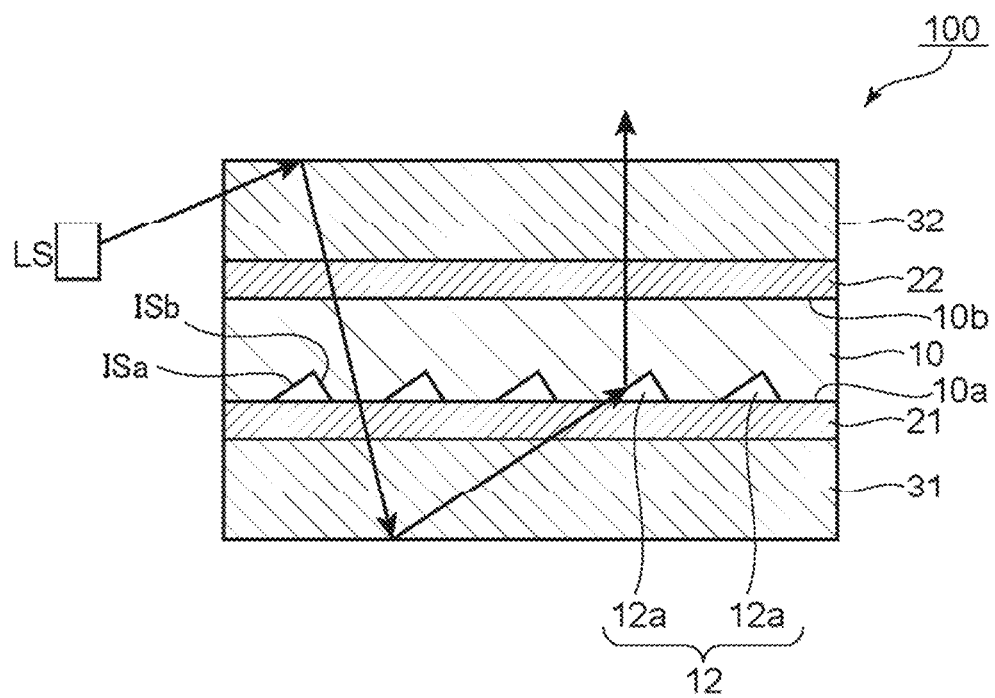

[FIG. 9]
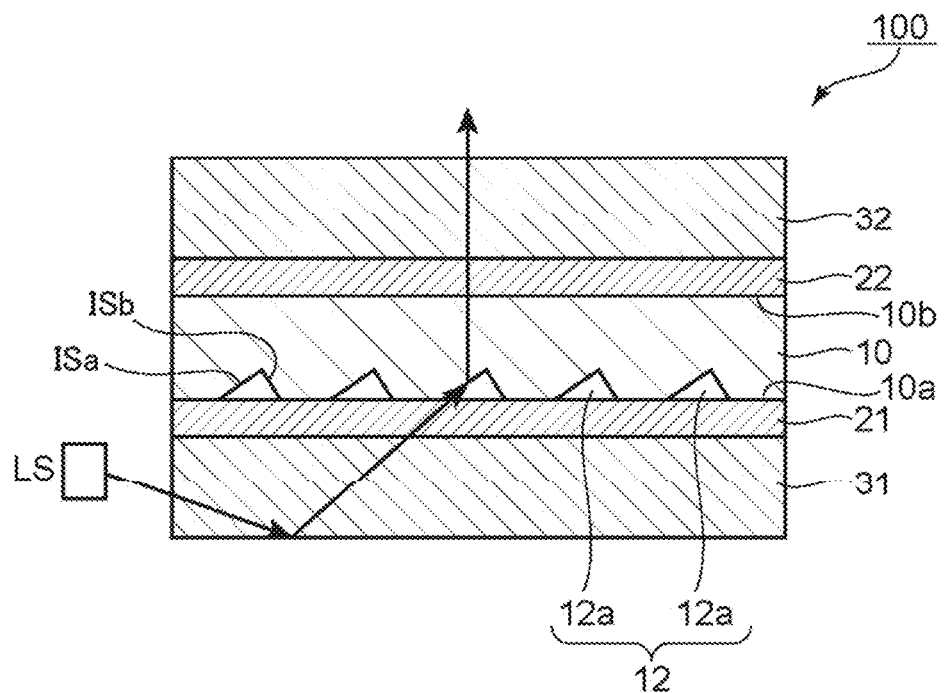

OPTICAL LAYERED BODY INCLUDING COVER SHEETS, PRESSURE-SENSITIVE ADHESIVE LAYERS, AND LIGHT EXTRACTION LAYER

TECHNICAL FIELD

The present invention relates to an optical laminate.

BACKGROUND ART

Attempts have been made to impart new functions to various widely-used products. An example of such attempt is to impart a design property to a product. More specifically, there have been proposed, for example, a technology for bonding a sheet-shaped product to a window to make the entirety of the window glow (surface lighting), and a technology for expressing a specific design in the sheet-shaped product (substantially making the sheet-shaped product glow in a predetermined pattern) A light extraction function is required for such technology, but there is a problem in that the current technologies may each provide an insufficient light extraction function.

CITATION LIST

Patent Literature

[PTL 1] JP 2012-149440 A

SUMMARY OF INVENTION

Technical Problem

The present invention has been made to solve the above-mentioned problem of the related art, and a primary object of the present invention is to provide an optical laminate having an excellent light extraction function.

Solution to Problem

According to at least one embodiment of the present invention, there is provided an optical laminate. The optical laminate includes: a light extraction layer having a first main surface and a second main surface, and having a light extraction mechanism including a recessed portion arranged on any one of the first main surface or the second main surface; a first cover sheet laminated via a first pressure-sensitive adhesive layer on a main surface side of the light extraction layer on which the light extraction mechanism is arranged; and a second cover sheet laminated via a second pressure-sensitive adhesive layer on a main surface side of the light extraction layer on which the light extraction mechanism is prevented from being arranged. The optical laminate has a region having a refractive index lower than a refractive index of the first pressure-sensitive adhesive layer or the second pressure-sensitive adhesive layer arranged on any one of a first main surface side or a second main surface side of the light extraction layer.

In one embodiment, the region is an air portion defined by the recessed portion of the light extraction mechanism and the first pressure-sensitive adhesive layer.

In one embodiment, the first pressure-sensitive adhesive layer includes a pressure-sensitive adhesive having a storage modulus of elasticity of $1.0 \times 10^5$ (Pa) or more.

In one embodiment, the first pressure-sensitive adhesive layer or the second pressure-sensitive adhesive layer includes a patterned pressure-sensitive adhesive, and the region is an air portion defined by a portion in which the pressure-sensitive adhesive is prevented from being arranged.

In one embodiment, the optical laminate has a porous layer having a refractive index of less than 1.20 formed between the light extraction layer and the first pressure-sensitive adhesive layer or the second pressure-sensitive adhesive layer, and the region is the porous layer.

In one embodiment, the porous layer is formed directly on a surface of the recessed portion of the light extraction mechanism.

In one embodiment, the porous layer has a haze of less than 5%.

In one embodiment, the porous layer has a thickness of 5 μm or less.

In one embodiment, the porous layer is formed of one or a plurality of kinds of constituent units each forming a fine pore structure, and the constituent units are chemically bonded to each other through a catalytic action.

In one embodiment, the constituent units of the porous layer are each a constituent unit having at least one shape selected from the group consisting of: a particle shape; a fiber shape; a rod shape; and a flat plate shape.

In one embodiment, a bond between the constituent units of the porous layer includes a hydrogen bond or a covalent bond. In one embodiment, any one of the first cover sheet or the second cover sheet functions as a light guide plate.

Advantageous Effects of Invention

According to the embodiment of the present invention, the optical laminate having an excellent light extraction function can be achieved.

BRIEF DESCRIPTION OF DRAWINGS

FIG. 1 is a schematic sectional view of an optical laminate according to one embodiment of the present invention.

FIG. 2 is a schematic sectional view of an optical laminate according to another embodiment of the present invention.

FIG. 3 is a schematic sectional view of an optical laminate according to still another embodiment of the present invention.

FIG. 4 is a schematic sectional view of an optical laminate according to still another embodiment of the present invention.

FIG. 5 is a schematic plan view for illustrating an example of the plan-view shape of a recessed portion and arrangement of the recessed portions in a light extraction layer of an optical laminate according to an embodiment of the present invention.

FIG. 6 is a schematic sectional view for specifically illustrating the shape of the recessed portion in the light extraction layer of the optical laminate according to the embodiment of the present invention.

FIG. 7(a) is a schematic plan view for more specifically illustrating the plan-view shape of the recessed portion of FIG. 5, and FIG. 7(b) is a schematic plan view for specifically illustrating another example of the plan-view shape of the recessed portion.

FIG. 8 is a schematic sectional view for illustrating an example of a light guide mode in the optical laminate according to the embodiment of the present invention.

FIG. 9 is a schematic sectional view for illustrating another example of the light guide mode in the optical laminate according to the embodiment of the present invention.

DESCRIPTION OF EMBODIMENTS

Embodiments of the present invention are described below. However, the present invention is not limited to these embodiments. First, an outline of the overall configuration of an optical laminate is described, and next, constituents of the optical laminate are specifically described.

A. Overall Configuration of Optical Laminate FIG. 1 is a schematic sectional view of an optical laminate according to one embodiment of the present invention. An optical laminate 100 of the illustrated example includes: a light extraction layer 10 having a first main surface 10a and a second main surface 10b, and having a light extraction mechanism 12 including a recessed portion 12a arranged on any one of the first main surface 10a or the second main surface 10b (on the first main surface 10a in the illustrated example); a first cover sheet 31 laminated via a first pressure-sensitive adhesive layer 21 on a main surface side of the light extraction layer 10 (first main surface 10a side in the illustrated example) on which the light extraction mechanism 12 is arranged; and a second cover sheet 32 laminated via a second pressure-sensitive adhesive layer 22 on a main surface side of the light extraction layer 10 (second main surface 10b side in the illustrated example) on which the light extraction mechanism 12 is prevented from being arranged. Typically, the optical laminate 100 can extract light upward by the extraction mechanism 12 while guiding light, which is emitted from a light source (not shown) on the left side of the figure, from the left side toward the right side of the figure. The recessed portion 12a of the extraction mechanism 12 typically has a first inclined surface ISa on a light source side and a second inclined surface ISb on a distal side to the light source. The inclination angle of the first inclined surface ISa is typically looser (smaller) than the inclination angle of the second inclined surface ISb. With such configuration, light can be extracted by being reflected on the first inclined surface. Light may be guided with the first cover sheet 31 or the second cover sheet 32, or with a light guide layer (not shown), which is arranged at a predetermined position of the optical laminate. The configurations (e.g., materials, mechanical characteristics, and optical characteristics) of the first pressure-sensitive adhesive layer 21 and the second pressure-sensitive adhesive layer 22 may be appropriately set in accordance with purposes. For example, the first pressure-sensitive adhesive layer 21 and the second pressure-sensitive adhesive layer 22 may have the same configuration, or may have configurations different from each other. The first cover sheet 31 and the second cover sheet 32 may each include, for example, glass or plastic (typically, an acrylic resin). The first cover sheet 31 and the second cover sheet 32 may have the same configuration, or may have configurations different from each other. In the embodiment of the present invention, a region 40 having a refractive index lower than the refractive index of the first pressure-sensitive adhesive layer 21 or the second pressure-sensitive adhesive layer 22 is arranged on any one of the first main surface 10a side or second main surface 10b side of the light extraction layer 10. When such region 40 is arranged, the optical laminate can express an excellent light extraction function.

In the example illustrated in FIG. 1, the region 40 is an air portion defined by the recessed portion 12a of the light extraction mechanism 12. In this case, the first pressure-sensitive adhesive layer 21 preferably includes a pressure-sensitive adhesive having a storage modulus of elasticity of $1.0 \times 10^5$ (Pa) or more. With such configuration, the pressure-sensitive adhesive for forming the first pressure-sensitive adhesive layer can be satisfactorily prevented from entering the recessed portion of the light extraction mechanism. Accordingly, the recessed portion 12a can be maintained as the air portion. As a result, excellent light extraction performance of the light extraction mechanism can be maintained.

The region 40 may be a porous layer. The porous layer preferably has a refractive index of less than 1.20. The porous layer may be typically formed between the light extraction layer and the first pressure-sensitive adhesive layer or the second pressure-sensitive adhesive layer. FIG. 2 is a schematic sectional view of an optical laminate according to an example of such configuration. In an optical laminate 101 of the illustrated example, a porous layer 40 is formed on the entirety of the first main surface 10a of the light extraction layer 10 (i.e., between the light extraction layer and the first pressure-sensitive adhesive layer). The porous layer may be formed through application or printing as described later. As a result, for example, as in the illustrated example, the porous layer 40 is formed directly on the first main surface 10a of the light extraction layer 10, and is hence also formed directly on the recessed portion 12a. With such configuration, the light extraction function is not affected by the pressure-sensitive adhesive layer, and hence the following advantages are obtained: light utilization efficiency is improved; and durability is improved.

FIG. 3 is a schematic sectional view for illustrating a modified example of the optical laminate of FIG. 2. In an optical laminate 102 of the illustrated example, the porous layer 40 is formed on the entirety of the first main surface 10a of the light extraction layer 10 except for the second inclined surface ISb of the recessed portion 12a. With such configuration, an unnecessary luminous intensity distribution derived from the second inclined surface can be cut, and hence extraction of light with a more controlled luminous intensity distribution can be achieved.

FIG. 4 is a schematic sectional view of an optical laminate according to still another example of a mode in which the porous layer is formed between the light extraction layer and the first pressure-sensitive adhesive layer or the second pressure-sensitive adhesive layer. In an optical laminate 103 of the illustrated example, the porous layer 40 is arranged between the light extraction layer 10 and the second pressure-sensitive adhesive layer 22. More specifically, the porous layer 40 is laminated via a third pressure-sensitive adhesive layer 23 on the second main surface 10b of the light extraction layer 10. With such configuration, light is not guided to any layer above the porous layer 40. As a result, even when dirt is present in and/or another layer for display is present as the layer above the porous layer or an uppermost layer, a loss of light does not occur, light efficiently propagates, and the light can be efficiently extracted. In this case, the second pressure-sensitive adhesive layer 22 and the third pressure-sensitive adhesive layer 23 each preferably include a pressure-sensitive adhesive having a storage modulus of elasticity of $1.0 \times 10^5$ (Pa) or more. With such configuration, the pressure-sensitive adhesive for forming each of those pressure-sensitive adhesive layers can be satisfactorily prevented from entering pores of the porous layer. As a result, effects exhibited by the porous layer can be maintained. When the porous layer is formed on a substrate, and a laminate of the porous layer and the substrate is incorporated in the optical laminate, a pressure-sensitive adhesive layer (generally, the second pressure-sensitive adhesive layer 22) on a substrate side may not have such a storage modulus of elasticity as described above.

In still another embodiment, the first pressure-sensitive adhesive layer or the second pressure-sensitive adhesive layer may include a patterned pressure-sensitive adhesive (not shown). With such configuration, an air portion defined by a portion in which the pressure-sensitive adhesive is prevented from being arranged may serve as the region. The pattern of the first pressure-sensitive adhesive layer or the second pressure-sensitive adhesive layer may be appropriately set in accordance with purposes. For example, the first pressure-sensitive adhesive layer or the second pressure-sensitive adhesive layer may form a pattern having an opening in a center portion in plan view.

The light extraction layer, the porous layer, and the first pressure-sensitive adhesive layer, the second pressure-sensitive adhesive layer, and the third pressure-sensitive adhesive layer are specifically described below. The first cover sheet and the second cover sheet each include glass or plastic as described above, and details about these materials are well known in the art and hence description thereof is omitted. The thicknesses of the first cover sheet and the second cover sheet may each be, for example, from 50 μm to 50 mm.

B. Light Extraction Layer

The light extraction layer 10 includes the light extraction mechanism 12 as described above. The light extraction mechanism 12 includes the plurality of recessed portions 12a. The recessed portions 12a each have: the first inclined surface ISa that directs part of light propagating in the optical laminate toward an emitting surface side by total internal reflection (TIR); and the second inclined surface ISb on an opposite side to the first inclined surface ISa. Typically, the first inclined surface ISa is an inclined surface on a light source side, and the second inclined surface ISb is an inclined surface on a distal side to a light source. The light extraction mechanism and the recessed portions are specifically described below with reference to FIG. 5 to FIG. 8.

A ratio (occupied area ratio) of the total area of the recessed portions to the area of the optical laminate in plan view is preferably from 1% to 80%. The upper limit of the occupied area ratio may be, for example, 50% or less, may be, for example, 45% or less, may be, for example, 30% or less, may be, for example, 10% or less, or may be, for example, 5% or less. As the occupied area ratio becomes smaller, a light extraction layer (as a result, an optical laminate) having a higher transmittance and/or a lower haze can be obtained. For example, when the occupied area ratio is 50%, a light extraction layer having a haze of 30% can be obtained. Meanwhile, the upper limit of the occupied area ratio may be set in accordance with a desired light extraction function. The occupied area ratio may be uniform throughout the light extraction layer, or may be configured to be increased along with an increase in distance from the light source. The uniform configuration has an advantage in that the configuration is suitable for mass production by a roll to roll method or a roll to sheet method. The configuration in which the occupied area ratio is increased along with an increase in distance from the light source has the following advantage: even when the distance from the light source is increased, a reduction in brightness does not occur.

FIG. 5 is a schematic plan view for illustrating an example of the plan-view shape of the recessed portion and arrangement of the recessed portions. As illustrated in FIG. 5, the plurality of recessed portions 12a are arranged so as to be separate from each other. The arrangement of the recessed portions 12a may have periodicity or regularity in at least one direction, or may not have periodicity and regularity. From the viewpoint of mass productivity, the arrangement of the recessed portions 12a is preferably uniform throughout the light extraction layer. In the illustrated example, the plurality of recessed portions 12a having substantially the same shape and having a curved surface that is convex in the same direction are arranged periodically in a light guiding direction and a direction perpendicular to the light guiding direction throughout the light extraction layer. In this case, a pitch Py between the recessed portions 12a in the light guiding direction is preferably from 10 μm to 500 μm, and a pitch Px therebetween in the direction perpendicular to the light guiding direction is preferably from 10 μm to 500 μm. In the illustrated example, the recessed portions 12a arranged so as to be displaced by a half pitch in each of the light guiding direction and the direction perpendicular to the light guiding direction are further provided.

The arrangement of the recessed portions 12a is not limited to the illustrated example, and may be appropriately set in accordance with, for example, purposes, the shape of the light extraction layer (optical laminate), and a desired luminous intensity distribution. For example, the recessed portions 12a may be arranged periodically in a direction having a predetermined angle with respect to the light guiding direction, or may be arranged periodically in a direction having a predetermined angle with respect to the direction perpendicular to the light guiding direction. The predetermined angle with respect to the light guiding direction and/or the direction perpendicular to the light guiding direction may be appropriately set in accordance with, for example, purposes, the shape of the light extraction layer (optical laminate), and a desired luminous intensity distribution.

While the light extraction mechanism 12 of the illustrated example includes the recessed portions 12a that are arranged periodically in each of the light guiding direction and the direction perpendicular to the light guiding direction (i.e., arranged so as to be separate from each other), the light extraction mechanism 12 may include, for example, groove-shaped (e.g., triangular prism-shaped) recessed portions each extending in the direction perpendicular to the light guiding direction.

Next, the shape of the recessed portion 12a is described. As illustrated in FIG. 5, when the optical laminate is seen from a normal direction, the first inclined surface ISa forms a curved surface that is convex on a light source side. The light source is, for example, an LED device, and a plurality of LED devices are arranged in the direction perpendicular to the light guiding direction. Light emitted from each of the plurality of LED devices spreads with respect to the light guiding direction, and hence when the first inclined surface ISa has a curved surface that is convex on the light source side, the first inclined surface ISa acts on the light more uniformly. For example, when a coupling optical system is arranged between the light source and a light receiving portion of the optical laminate to cause highly collimated light (light that less spreads with respect to the light guiding direction) to enter, the first inclined surface ISa may be parallel to the direction perpendicular to the light guiding direction. The curved surface of the first inclined surface ISa that is convex on the light source side is represented by, for example, a quartic curve.

FIG. 6 is a schematic sectional view for specifically illustrating the shape of the recessed portion, FIG. 7(a) is a schematic plan view for more specifically illustrating the plan-view shape of the recessed portion of FIG. 5, and FIG. 7(b) is a schematic plan view for specifically illustrating another example of the plan-view shape of the recessed portion. As illustrated in FIG. 6, the sectional shape of the recessed portion 12a is, for example, a triangle. An inclination angle θa of the first inclined surface ISa on the light source side is, for example, from 10° to 70°. When the inclination angle θa is less than 10°, the controllability of the luminous intensity distribution may become insufficient to result in insufficient light extraction efficiency. Meanwhile, when the inclination angle θa is more than 70°, for example, it may become difficult to process a shaping film (film for forming the light extraction layer). An inclination angle θb of the second inclined surface ISb is, for example, from 50° to 100°. When the inclination angle θb is less than 50°, stray light may be generated in an unintended direction. When the inclination angle θb is more than 100°, for example, it may become difficult to process the shaping film (film for forming the light extraction layer). As illustrated in each of FIG. 7(a) and FIG. 7(b), a length L of the recessed portion 12a is preferably from 10 μm to 500 μm, and a width W thereof is preferably from 1 μm to 100 μm. The length L is, for example, twice or more as large as the width W. A height H is preferably from 1 μm to 100 μm. Depending on processing accuracy at the time of the formation of a shaping film including recessed portions each having the plan-view shape illustrated in FIG. 7(a), recessed portions each having the plan-view shape illustrated in FIG. 7(b) may be formed. Even in such case, the plan-view shape of the recessed portion can be characterized by the length L and the width W.

The light extraction layer 10 may include any appropriate material as long as such a light extraction mechanism as described above is formed. The light extraction layer may typically include a material having a high transmittance for visible light. Examples of such material include acrylic resins such as polymethyl methacrylate (PMMA), polycarbonate (PC)-based resins, cycloolefin-based resins, and glass (e.g., quartz glass, alkali-free glass, and borosilicate glass).

The light extraction layer may be formed of a single (integrated) shaping film, or the light extraction mechanism may be formed on a substrate. The light extraction mechanism may be formed by any appropriate method. When the light extraction mechanism is formed on the substrate, the light extraction mechanism may be formed, for example, as follows: the surface of a film (substrate) including the above-mentioned material is coated with lacquer; an optical pattern (corresponding to the light extraction mechanism) is embossed on the surface of the film including the lacquer; and after that, the lacquer is cured. Such method is described in, for example, JP 2013-524288 A, the description of which is incorporated herein by reference.

The thickness of the light extraction layer is preferably from 5 μm to 200 μm, more preferably from 5 μm to 150 μm, still more preferably from 5 μm to 100 μm. When the light extraction layer includes the single shaping film, its thickness may be, for example, from 100 μm to 130 μm. When the light extraction layer includes the substrate and the light extraction mechanism formed on the substrate, the thickness of the substrate may be, for example, from 20 μm to 40 μm, and the thickness of the light extraction mechanism may be, for example, from 5 μm to 20 μm.

C. Porous Layer

The porous layer typically has pores in an inside thereof. The porosity of the porous layer is preferably from 20 vol % to 60 vol %, more preferably from 25 vol % to 55 vol %, still more preferably from 30 vol % to 50 vol %, particularly preferably from 35 vol % to 45 vol %. When the porosity falls within such ranges, the refractive index of the porous layer can be set within an appropriate range, and predetermined mechanical strength can be ensured. The porosity is a value calculated from the value of the refractive index measured with an ellipsometer by using Lorentz-Lorenz's formula.

The refractive index of the porous layer is, for example, less than 1.30, and is preferably less than 1.20 as described above, more preferably from 1.10 to 1.19, still more preferably from 1.12 to 1.18, particularly preferably from 1.15 to 1.18. When the porous layer having such refractive index is arranged at a predetermined position, the optical laminate can express an excellent light extraction function. Substantially, the light extraction function of the light extraction layer can be satisfactorily maintained. Further, the breakage of the porous layer can be suppressed. The refractive index refers to a refractive index measured at a wavelength of 550 nm unless otherwise stated. The refractive index is a value measured by a method described in "(1) Refractive Index of Porous Layer" in Examples below.

The total light transmittance of the porous layer is preferably from 85% to 99%, more preferably from 87% to 98%, still more preferably from 89% to 97%. When the porous layer having such total light transmittance is arranged at a predetermined position, excellent transparency can be achieved in the entirety of the optical laminate. As a result, adverse effects in the applications of the optical laminate can be suppressed.

The haze of the porous layer is, for example, less than 5%, preferably less than 3%. Meanwhile, the haze is, for example, 0.1% or more, preferably 0.2% or more. When the porous layer having such haze is arranged at a predetermined position, excellent transparency can be achieved in the entirety of the optical laminate. As a result, adverse effects in the applications of the optical laminate can be suppressed. The haze may be measured by, for example, the following method.

A pore layer (porous layer) is cut into a size measuring 50 mm by 50 mm, and is set in a haze meter (manufactured by Murakami Color Research Laboratory Co., Ltd.: HM-150), followed by the measurement of its haze. The haze value is calculated from the following equation.

$$\text{Haze (\%)} = [\text{diffuse transmittance (\%)/total light transmittance (\%)}] \times 100(\%)$$

The thickness of the porous layer is preferably from 30 nm to 5 μm, more preferably from 200 nm to 4 μm, still more preferably from 400 nm to 3 μm, particularly preferably from 600 nm to 2 μm. When the thickness of the porous layer falls within such ranges, the porous layer can effectively exhibit a total reflection function for light beams ranging from visible light to light in the infrared region.

Any appropriate configuration may be adopted for the porous layer as long as the layer has the above-mentioned desired characteristics. The porous layer may be preferably formed through, for example, application or printing. Materials described in, for example, WO 2004/113966 A1, JP 2013-254183 A, and JP 2012-189802 A may each be adopted as a material for forming the porous layer. A typical example thereof is a silicon compound. Examples of the silicon compound include: silica-based compounds; hydrolyzable silanes, and partial hydrolysates and dehydration condensates thereof; silanol group-containing silicon compounds; and active silica obtained by bringing a silicate into contact with an acid or an ion-exchange resin. Examples thereof also include: organic polymers; polymerizable monomers (e.g., a (meth)acrylic monomer and a styrene-based monomer); and curable resins (e.g., a (meth)acrylic resin, a fluorine-containing resin, and a urethane resin). Those materials may be used alone or in combination thereof. The porous layer may be formed by, for example, applying or printing a solution or a dispersion liquid of such material.

The size of each of the pores (holes) in the porous layer refers to a major axis diameter out of the major axis diameter and minor axis diameter of the pore (hole). The sizes of the pores (holes) are, for example, from 2 nm to 500 nm. The sizes of the pores (holes) are, for example, 2 nm or more, preferably 5 nm or more, more preferably 10 nm or more, still more preferably 20 nm or more. Meanwhile, the sizes of the pores (holes) are, for example, 500 nm or less, preferably 200 nm or less, more preferably 100 nm or less. The range of the sizes of the pores (holes) is, for example, from 2 nm to 500 nm, preferably from 5 nm to 500 nm, more preferably from 10 nm to 200 nm, still more preferably from 20 nm to 100 nm. The sizes of the pores (holes) may be adjusted to desired sizes in accordance with, for example, purposes and applications.

The sizes of the pores (holes) may be quantified by a BET test method. Specifically, 0.1 g of the sample (formed pore layer) is loaded into the capillary of a specific surface area-measuring apparatus (manufactured by Micromeritics Instrument Corporation, ASAP 2020), and is then dried under reduced pressure at room temperature for 24 hours so that a gas in its pore structure may be removed. Then, an adsorption isotherm is drawn by causing the sample to adsorb a nitrogen gas, and its pore size distribution is determined. Thus, the pore sizes may be evaluated.

The porous layer having the pores therein is, for example, a porous layer having a porous layer and/or an air layer in at least part thereof. The porous layer typically contains aerogel and/or particles (e.g., hollow fine particles and/or porous particles). The porous layer may be preferably a nanoporous layer (specifically a porous layer in which the diameters of 90% or more of micropores fall within the range of from $10^{-1}$ nm to $10^3$ nm).

Any appropriate particles may be adopted as the particles. The particles are each typically formed of a silica-based compound. Examples of the shapes of the particles include a spherical shape, a plate shape, a needle shape, a string shape, and a botryoidal shape. String-shaped particles are, for example, particles in which a plurality of particles each having a spherical shape, a plate shape, or a needle shape are strung together like beads, short fiber-shaped particles (e.g., short fiber-shaped particles described in JP 2001-188104 A), and a combination thereof. The string-shaped particles may be linear or may be branched. Botryoidal-shaped particles are, for example, particles in which a plurality of spherical, plate-shaped, and needle-shaped particles aggregate to form a botryoidal shape. The shapes of the particles may be identified through, for example, observation with a transmission electron microscope.

An example of a specific configuration of the porous layer is described below. The porous layer of this embodiment is formed of one or a plurality of kinds of constituent units each forming a fine pore structure, and the constituent units are chemically bonded to each other through a catalytic action. Examples of the shape of each of the constituent units include a particle shape, a fiber shape, a rod shape, and a flat plate shape. The constituent units may have only one shape, or may have two or more shapes in combination. In the following description, a case in which the porous layer is a pore layer of a porous body in which the microporous particles are chemically bonded to each other is mainly described.

Such pore layer may be formed by, for example, chemically bonding the microporous particles to each other in a pore layer-forming step. In the embodiment of the present invention, the shapes of the "particles" (e.g., the microporous particles) are not particularly limited. For example, the shapes may each be a spherical shape, or may each be any other shape. In addition, in the embodiment of the present invention, the microporous particles may be, for example, sol-gel beaded particles, nanoparticles (hollow nanosilica nanoballoon particles), or nanofibers. The microporous particles each typically contain an inorganic substance. Specific examples of the inorganic substance include silicon (Si), magnesium (Mg), aluminum (Al), titanium (Ti), zinc (Zn), and zirconium (Zr). Those inorganic substances may be used alone or in combination thereof. In one embodiment, the microporous particles are, for example, microporous particles of a silicon compound, and the porous body is, for example, a silicone porous body. The microporous particles of the silicon compound each contain, for example, a pulverized body of a gel-like silica compound. In addition, another form of the porous layer having the porous layer and/or the air layer in at least part thereof is, for example, a pore layer having the following features: the layer is formed of fibrous substances such as nanofibers; and the fibrous substances are entangled with each other to form pores, thereby forming the layer. A method of producing such pore layer is not particularly limited, and is the same as that in the case of, for example, the pore layer of the porous body in which the microporous particles are chemically bonded to each other. Still another form thereof is, for example, a pore layer using hollow nanoparticles or nanoclay, or a pore layer formed by using hollow nanoballoons or magnesium fluoride. The pore layer may be a pore layer formed of a single constituent substance, or may be a pore layer formed of a plurality of constituent substances. The pore layer may include any one of the above-mentioned forms, or may include two or more of the above-mentioned forms.

In this embodiment, the porous structure of the porous body may be, for example, an open-cell structural body in which hole structures are continuous with each other. The open-cell structural body means, for example, that the hole structures are three-dimensionally continuous with each other in the silicone porous body, and the structural body can be said to be a state in which the internal pores of the hole structures are continuous with each other. When the porous body has an open-cell structure, its porosity can be increased. However, when closed-cell particles (particles each individually having a hole structure) such as hollow silica are used, an open-cell structure cannot be formed. Meanwhile, for example, when silica sol particles (pulverized products of a gel-like silicon compound that forms sol) are used, the particles each have a three-dimensional dendritic structure, and hence the dendritic particles are sedimented and deposited in a coating film (coating film of the sol containing the pulverized products of the gel-like silicon compound). Accordingly, an open-cell structure can be easily formed. The porous layer more preferably has a monolith structure in which an open-cell structure includes a plurality of pore size distributions. The monolith structure means, for example, a hierarchical structure including a structure in which nanosized fine pores are present and an open-cell structure in which the nanosized pores assemble. When the monolith structure is formed, both of film strength and a high porosity may be achieved by, for example, imparting the high porosity to the layer through use of a coarse open-cell pore while imparting the film strength thereto through use of a fine pore. Such monolith structure may be preferably formed by controlling the pore size distribution of a pore structure to be produced in the gel (gel-like silicon compound) at a stage before its pulverization into the silica sol particles. In addition, the monolith structure may be formed by, for example, controlling the particle size distribution of the silica sol particles after the pulverization to a desired size at the time of the pulverization of the gel-like silicon compound.

The porous layer contains, for example, the pulverized products of a gel-like compound as described above, and the pulverized products are chemically bonded to each other. The form of the chemical bond (chemical bonding) between the pulverized products in the porous layer is not particularly limited, and examples thereof include a cross-linking bond, a covalent bond, and a hydrogen bond.

The volume-average particle diameter of the pulverized products in the porous layer is, for example, 0.10 µm or more, preferably 0.20 µm or more, more preferably 0.40 µm or more. Meanwhile, the volume-average particle diameter is, for example, 2.00 µm or less, preferably 1.50 µm or less, more preferably 1.00 µm or less. The range of the volume-average particle diameter is, for example, from 0.10 µm to 2.00 µm, preferably from 0.20 µm to 1.50 µm, more preferably from 0.40 µm to 1.00 µm. The particle size distribution of the pulverized products may be measured with, for example, a particle size distribution-evaluating apparatus based on a dynamic light scattering method, a laser diffraction method, or the like, and an electron microscope, such as a scanning electron microscope (SEM) or a transmission electron microscope (TEM). The volume-average particle diameter is an indicator of a variation in particle size of the pulverized products.

The kind of the gel-like compound is not particularly limited. The gel-like compound is, for example, a gel-like silicon compound.

In addition, in the porous layer (pore layer), for example, silicon atoms to be incorporated preferably form a siloxane bond. As a specific example, the ratio of unbonded silicon atoms (in other words, residual silanol groups) out of all the silicon atoms in the pore layer is, for example, less than 50%, preferably 30% or less, more preferably 15% or less.

An example of a method of forming such porous layer is described below.

The method typically includes: a precursor-forming step of forming a pore structure, which is a precursor of the porous layer (pore layer), on a light extraction layer; and a cross-linking reaction step of causing a cross-linking reaction in the precursor after the precursor-forming step. The method further includes: a containing liquid-producing step of producing a containing liquid containing microporous particles (hereinafter sometimes referred to as "microporous particle-containing liquid" or simply "containing liquid"); and a drying step of drying the containing liquid. In the precursor-forming step, the microporous particles in a dried body are chemically bonded to each other to form the precursor. The containing liquid is not particularly limited, and is, for example, a suspension containing the microporous particles. In the following, a case in which the microporous particles are pulverized products of the gel-like compound, and the pore layer is a porous body (preferably a silicone porous body) containing the pulverized products of the gel-like compound is mainly described. However, even when the microporous particles are products other than the pulverized products of the gel-like compound, the porous layer may be similarly formed.

According to the above-mentioned method, for example, a porous layer (pore layer) having an extremely low refractive index is formed. A reason for the foregoing is assumed to be, for example, as described below. However, the assumption does not limit the method of forming the porous layer.

The above-mentioned pulverized products are obtained by pulverizing the gel-like silicon compound, and hence a state in which the three-dimensional structure of the gel-like silicon compound before the pulverization is dispersed in a three-dimensional basic structure is established. Further, in the above-mentioned method, the application of the crushed products of the gel-like silicon compound onto the resin film results in the formation of the precursor of a porous structure based on the three-dimensional basic structure. In other words, according to the method, a new porous structure (three-dimensional basic structure) different from the three-dimensional structure of the gel-like silicon compound is formed by the application of the pulverized products. Accordingly, in the pore layer to be finally obtained, such a low refractive index that the layer functions to the same extent as, for example, an air layer does may be achieved. Further, in the method, the three-dimensional basic structure is fixed because the pulverized products are chemically bonded to each other. Accordingly, the pore layer to be finally obtained can maintain sufficient strength and sufficient flexibility despite the fact that the layer is a structure having pores.

Details about a specific configuration of, and a specific formation method for, the porous layer are described in, for example, WO 2019/151073 A1, the description of which is incorporated herein by reference.

D. Pressure-Sensitive Adhesive Layer

Different configurations may be adopted for the first pressure-sensitive adhesive layer 21, the second pressure-sensitive adhesive layer 22, and the third pressure-sensitive adhesive layer 23 depending on whether or not each of the layers is adjacent to the light extraction mechanism 12 (substantially, the recessed portion 12*a*) or the porous layer 40. A pressure-sensitive adhesive layer adjacent to the recessed portion 12*a* or the porous layer 40 (each of the first pressure-sensitive adhesive layer 21 of each of FIG. 1 to FIG. 4, and the second pressure-sensitive adhesive layer 22 and third pressure-sensitive adhesive layer 23 of FIG. 4) is hereinafter sometimes referred to as "adjacent pressure-sensitive adhesive layer," and a pressure-sensitive adhesive layer not adjacent thereto (the second pressure-sensitive adhesive layer 22 of each of FIG. 1 to FIG. 3) is hereinafter sometimes referred to as "separate pressure-sensitive adhesive layer."

The adjacent pressure-sensitive adhesive layer has such hardness that under a normal state, a pressure-sensitive adhesive for forming the adjacent pressure-sensitive adhesive layer does not permeate the recessed portion or the pores of the porous layer. The storage modulus of elasticity of the adjacent pressure-sensitive adhesive layer at 23° C. is typically from $1.0 \times 10^5$ (Pa) to $1.0 \times 10^7$ (Pa). The storage modulus of elasticity is, for example, $1.1 \times 10^5$ (Pa) or more, $1.2 \times 10^5$ (Pa) or more, $1.3 \times 10^5$ (Pa) or more, $1.4 \times 10^5$ (Pa) or more, $1.5 \times 10^5$ (Pa) or more, $1.6 \times 10^5$ (Pa) or more, $1.7 \times 10^5$ (Pa) or more, $1.8 \times 10^5$ (Pa) or more, $1.9 \times 10^5$ (Pa) or more, or $2.0 \times 10^5$ (Pa) or more, and $1.0 \times 10^7$ (Pa) or less, $5.0 \times 10^6$ (Pa)

or less, $1.0 \times 10^6$ (Pa) or less, or $5.0 \times 10^5$ (Pa) or less. The storage modulus of elasticity is preferably from $1.3 \times 10^5$ (Pa) to $1.0 \times 10^6$ (Pa), more preferably from $1.5 \times 10^5$ (Pa) to $5.0 \times 10^5$ (Pa). The storage modulus of elasticity is determined by reading a value at 23° C. at the time of measurement in conformity with a method described in JIS K 7244-1 "Plastics-Determination of dynamic mechanical properties" under the condition of a frequency of 1 Hz in the range of from −50° C. to 150° C. at a rate of temperature increase of 5° C./min.

Any appropriate pressure-sensitive adhesive may be used as the pressure-sensitive adhesive for forming the adjacent pressure-sensitive adhesive layer as long as the pressure-sensitive adhesive has such characteristic as described above. The pressure-sensitive adhesive is typically, for example, an acrylic pressure-sensitive adhesive (acrylic pressure-sensitive adhesive composition). The acrylic pressure-sensitive adhesive composition typically contains a (meth)acrylic polymer as a main component (base polymer). The (meth)acrylic polymer may be incorporated into the pressure-sensitive adhesive composition at a ratio of, for example, 50 wt % or more, preferably 70 wt % or more, more preferably 90 wt % or more in the solid content of the pressure-sensitive adhesive composition. The (meth)acrylic polymer contains, as a main component, an alkyl (meth)acrylate serving as a monomer unit. The term "(meth)acrylate" refers to an acrylate and/or a methacrylate. The alkyl group of the alkyl (meth)acrylate is, for example, a linear or branched alkyl group having 1 to 18 carbon atoms. The average number of carbon atoms of the alkyl group is preferably from 3 to 9. As a monomer for forming the (meth)acrylic polymer, in addition to the alkyl (meth)acrylate, there are given comonomers, such as a carboxyl group-containing monomer, a hydroxyl group-containing monomer, an amide group-containing monomer, an aromatic ring-containing (meth)acrylate, and a heterocycle-containing (meth)acrylate. The comonomer is preferably a hydroxyl group-containing monomer and/or a heterocycle-containing (meth)acrylate, more preferably N-acryloylmorpholine. The acrylic pressure-sensitive adhesive composition may preferably contain a silane coupling agent and/or a cross-linking agent. The silane coupling agent is, for example, an epoxy group-containing silane coupling agent. The cross-linking agent is, for example, an isocyanate-based cross-linking agent or a peroxide-based cross-linking agent. Details about such pressure-sensitive adhesive layer or acrylic pressure-sensitive adhesive composition are described in, for example, JP 4140736 B2, the description of which is incorporated herein by reference.

The thickness of the adjacent pressure-sensitive adhesive layer is preferably from 3 μm to 30 μm, more preferably from 5 μm to 10 μm. When the thickness of the adjacent pressure-sensitive adhesive layer falls within such ranges, the following advantage is obtained: an influence on the light extraction layer is small while the adjacent pressure-sensitive adhesive layer has a sufficient adhesive strength.

The separate pressure-sensitive adhesive layer includes any appropriate pressure-sensitive adhesive. In one embodiment, the separate pressure-sensitive adhesive layer includes a pressure-sensitive adhesive having such softness as to be capable of absorbing transfer of vibration to suppress the breakage of the porous layer. The storage modulus of elasticity of the separate pressure-sensitive adhesive layer at 23° C. is, for example, $1.0 \times 10^5$ (Pa) or less, and is, for example, $1.0 \times 10^5$ (Pa) or less, $9.5 \times 10^4$ (Pa) or less, $9.0 \times 10^4$ (Pa) or less, $8.5 \times 10^4$ (Pa) or less, $8.0 \times 10^4$ (Pa) or less, $7.5 \times 10^4$ (Pa) or less, or $7.0 \times 10^4$ (Pa) or less, and $1.0 \times 10^3$ (Pa) or more, $5.0 \times 10^3$ (Pa) or more, $1.0 \times 10^4$ (Pa) or more, or $5.0 \times 10^4$ (Pa) or more. The storage modulus of elasticity is preferably from $5.0 \times 10^3$ (Pa) to $9.0 \times 10^4$ (Pa) or less, more preferably from $1.0 \times 10^4$ (Pa) to $8.5 \times 10^4$ (Pa).

Any appropriate pressure-sensitive adhesive may be used as the pressure-sensitive adhesive for forming the separate pressure-sensitive adhesive layer as long as the pressure-sensitive adhesive has such characteristic as described above. The pressure-sensitive adhesive is typically, for example, an acrylic pressure-sensitive adhesive (acrylic pressure-sensitive adhesive composition). The acrylic pressure-sensitive adhesive composition is as described above. However, the pressure-sensitive adhesive for forming the separate pressure-sensitive adhesive layer is preferably free of a heterocycle-containing (meth)acrylate as a comonomer. In addition, the weight-average molecular weight Mw of a base polymer in the pressure-sensitive adhesive composition is preferably 2,000,000 or less, more preferably from 5,000 to 1,600,000. Details about the separate pressure-sensitive adhesive layer or the acrylic pressure-sensitive adhesive composition for forming the separate pressure-sensitive adhesive layer are described in, for example, JP 2016-190996 A, the description of which is incorporated herein by reference.

The thickness of the separate pressure-sensitive adhesive layer is preferably from 5 μm to 300 μm, more preferably from 10 μm to 200 μm. When the thickness of the separate pressure-sensitive adhesive layer falls within such ranges, impact is alleviated particularly at the time of the vibration of the optical member in a lateral direction, and hence damage to the porous layer can be reduced.

When the cover sheet 31 and/or the cover sheet 32 includes glass, a pressure-sensitive adhesive layer (intermediate film) for bonding the cover sheet 31 and/or the cover sheet 32 and the light extraction layer 10 may be formed of polyvinyl butyral, an ethylene-vinyl acetate copolymer resin, or an ionomer resin, may have an adhesive applied on the surface thereof, or may be formed of any other resin material. The thickness of the pressure-sensitive adhesive layer (intermediate film) is, for example, from 0.1 mm to 5 mm, and the upper limit thereof is preferably 1 mm or less. It is preferred that the pressure-sensitive adhesive layer (intermediate film) be transparent and have a high transmittance.

The cover sheet, the pressure-sensitive adhesive layer (intermediate film), and the light extraction layer may be pressurized at a predetermined temperature (e.g., from 100° C. to 150° C.) to be brought into close contact with each other. The resultant laminate may be further subjected to heating and pressurizing treatment in an autoclave. With this, when the cover sheet, the pressure-sensitive adhesive layer (intermediate film), and the light extraction layer are laminated on and integrated with each other, the pressure-sensitive adhesive layer (intermediate film) is melted to become an adhesive.

E. Usage Form of Optical Laminate

The optical laminate according to each of the embodiments of the present invention can extract light from a light source on a main surface side of the light extraction layer on which the light extraction mechanism is prevented from being arranged (upward in the illustrated example). In one embodiment, as illustrated in FIG. 8, light is guided mainly with the second cover sheet 32. That is, the second cover sheet 32 may function as a main light guide layer. Specifically, while light having entered the second cover sheet 32 from a light source LS repeatedly reflects in the second cover sheet 32 and/or between the second cover sheet 32 and the first cover sheet 31, the light propagates mainly in the second cover sheet 32, and reflects on the first inclined surface ISa of the recessed portion 12a of the light extraction mechanism 12 to be emitted above the optical laminate. In another embodiment, as illustrated in FIG. 9, light is guided mainly with the first cover sheet 31. That is, the first cover sheet 31 may function as a main light guide layer. Specifically, while light having entered the first cover sheet 31 from the light source LS repeatedly reflects in the first cover sheet 31 and/or between the first cover sheet 31 and the second cover sheet 32, the light propagates mainly in the first cover sheet 31, and reflects on the first inclined surface ISa of the recessed portion 12a of the light extraction mechanism 12 to be emitted above the optical laminate. In still another embodiment, a light guide layer (not shown) may be separately arranged. In this case, the light guide layer may be typically arranged between the first cover sheet 31 or the second cover sheet 32 and the light extraction layer 10.

The optical laminate according to each of the embodiments of the present invention can satisfactorily extract light from the light source as described above, and hence can be suitably used in applications in which a design property is imparted to a product with light. For example, the optical laminate can be used for a window. The window is not limited to a window of a building, and may be, for example, a window for viewing an inside of a box-shaped product. In such applications, for example, the following operations may be performed: the optical laminate is caused to function as a general window by turning off the light source; and the optical laminate (window) is caused to uniformly glow in its entirety, or to express a predetermined design (e.g., a pattern, a motif, a character, or a pictorial pattern) by turning on the light source.

EXAMPLES

Now, the present invention is specifically described by way of Examples. However, the present invention is not limited to these Examples. Measurement methods for characteristics are as described below. In addition, unless otherwise specified, "%" and "part (s)" in Examples are by weight.
(1) Refractive Index of Porous Layer A piece obtained by forming a porous layer on an acrylic film and then cutting the resultant into a size measuring 25 mm by 50 mm was bonded to the front surface of a glass plate (thickness: 3 mm) via a pressure-sensitive adhesive. A central portion (having a diameter of about 20 mm) on the rear surface of the glass plate was daubed with a black marker pen. Thus, a sample in which light was not reflected on the rear surface of the glass plate was obtained. The sample was set in an ellipsometer (manufactured by J.A. Woollam Japan: VASE), and its refractive index was measured under the conditions of a wavelength of 550 nm and an incident angle of from 50° to 80°.
(2) Light Extraction Characteristic An LED light source was placed on an end portion of a lower cover sheet of an optical laminate obtained in each of Examples and Comparative Example. Light was caused to enter an inside of the optical laminate from the end portion of the lower cover sheet, and was extracted from a light extraction layer side (upper side). The extracted light was measured for a brightness distribution (relationship between an output angle and brightness) with a brightness distribution meter ("Conoscope 070" manufactured by Radiant Vision Systems). The size of a measurement area was 35 mm by 35 mm (the same as the size of a detector lens). The maximum brightness ($Cd/m^2$) on a viewer side was determined from the measured brightness distribution.

[Production Example 1] Preparation of Coating Liquid for Forming Porous Layer (1) Gelation of Silicon Compound 0.95 g of methyltrimethoxysilane (MTMS) that was a precursor of a silicon compound was dissolved in 2.2 g of dimethyl sulfoxide (DMSO). Thus, a mixed liquid A was prepared. 0.5 g of a 0.01 mol/L aqueous solution of oxalic acid was added to the mixed liquid A, and the mixture was stirred at room temperature for 30 minutes so that MTMS was hydrolyzed. Thus, a mixed liquid B containing tris (hydroxy)methylsilane was produced.

0.38 g of 28 wt % ammonia water and 0.2 g of pure water were added to 5.5 g of DMSO, and then the mixed liquid B was further added to the mixture, followed by stirring at room temperature for 15 minutes to perform the gelation of tris(hydroxy)methylsilane. Thus, a mixed liquid C containing a gel-like silicon compound was obtained.
(2) Aging Treatment Aging treatment was performed by incubating the mixed liquid C containing the gel-like silicon compound, which had been prepared as described above, as it was at 40° C. for 20 hours.
(3) Pulverization Treatment Next, the gel-like silicon compound subjected to the aging treatment as described above was crushed into granular shapes each having a size of from several millimeters to several centimeters with a spatula. Next, 40 g of isopropyl alcohol (IPA) was added to the mixed liquid C, and the mixture was lightly stirred. After that, the mixture was left at rest at room temperature for 6 hours so that the solvent and the catalyst in the gel were decanted. Similar decantation treatment was performed three times to replace the solvent with IPA. Thus, a mixed liquid D was obtained. Next, the gel-like silicon compound in the mixed liquid D was subjected to pulverization treatment (high-pressure media-less pulverization). The pulverization treatment (high-pressure media-less pulverization) was performed as follows: a homogenizer (manufactured by SMT Co., Ltd., product name: "UH-50") was used, and 1.85 g of the gel-like silicon compound in the mixed liquid D and 1.15 g of IPA were weighed in a 5-cubic centimeter screw bottle, followed by the performance of the pulverization of the mixture under the conditions of 50 W and 20 kHz for 2 minutes.

The gel-like silicon compound in the mixed liquid D was pulverized by the pulverization treatment, and hence the mixed liquid D was turned into a sol liquid E of the pulverized products. A volume-average particle diameter representing a variation in particle size of the pulverized products in the sol liquid E was determined to be from 0.50 to 0.70 with a dynamic light scattering-type nanotrack particle size analyzer (manufactured by Nikkiso Co., Ltd., UPA-EX150). Further, a methyl ethyl ketone (MEK) solution of a photobase generator (Wako Pure Chemical Industries, Ltd.: product name: WPBG-266) having a concentration of 1.5 wt % and a MEK solution of bis(trimethoxysilyl) ethane having a concentration of 5% were added at ratios of 0.062 g and 0.036 g, respectively to 0.75 g of the sol liquid E. Thus, a coating liquid for forming a porous layer was obtained.

[Production Example 2] Preparation of Pressure-Sensitive Adhesive for Forming Adjacent Pressure-Sensitive Adhesive Layer 90.7 Parts of butyl acrylate, 6 parts of N-acryloylmorpholine, 3 parts of acrylic acid, 0.3 part of 2-hydroxybutyl acrylate, and 0.1 part of 2,2'-azobisisobutyronitrile serving as a polymerization initiator were loaded into a four-necked flask including a stirring blade, a temperature gauge, a nitrogen gas-introducing tube, and a condenser together with 100 g of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare an acrylic polymer solution. 0.2 Part of an isocyanate cross-linking agent (CORONATE L manufactured by Nippon Polyurethane Industry Co., Ltd., tolylene diisocyanate adduct of trimethylolpropane), 0.3 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive solution. Next, the acrylic pressure-sensitive adhesive solution was applied to one surface of a silicone-treated polyethylene terephthalate (PET) film (manufactured by Mitsubishi Chemical Polyester Film Co., Ltd., thickness: 38 μm) so that the thickness of a pressure-sensitive adhesive layer after drying became 20 μm, followed by drying at 150° C. for 3 minutes. Thus, the pressure-sensitive adhesive layer was formed. The resultant pressure-sensitive adhesive layer had a storage modulus of elasticity of $1.3 \times 10^5$ (Pa).

[Production Example 3] Preparation of Pressure-Sensitive Adhesive for Forming Separate Pressure-Sensitive Adhesive Layer 99 Parts of butyl acrylate, 1 part of 4-hydroxybutyl acrylate, and 0.1 part of 2,2'-azobisisobutyronitrile serving as a polymerization initiator were loaded into a four-necked flask including a stirring blade, a temperature gauge, a nitrogen gas-introducing tube, and a condenser together with 100 parts of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare an acrylic polymer solution. 0.1 Part of an isocyanate cross-linking agent (TAKENATE D110N manufactured by Mitsui Takeda Chemicals Inc., trimethylolpropane xylylene diisocyanate), 0.1 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive composition solution. Next, the acrylic pressure-sensitive adhesive composition solution was applied to one surface of a polyethylene terephthalate film treated with a silicone-based releasing agent (separator film: manufactured by Mitsubishi Chemical Polyester Film Co., Ltd., MRF 38), and was dried at 150° C. for 3 minutes to form a pressure-sensitive adhesive layer having a thickness of 20 μm on the surface of the separator film. The resultant pressure-sensitive adhesive layer had a storage modulus of elasticity of $8.2 \times 10^4$ (Pa).

[Production Example 4] Production of Film Including Recessed Portion for Forming Light Extraction Layer A film including recessed portions on one of main surfaces thereof was produced in accordance with a method described in JP 2013-524288 A. Specifically, the following operations were performed. The surface of a polymethyl methacrylate (PMMA) film (thickness: 40 μm) was coated with lacquer (Fine Cure RM-64 manufactured by Sanyo Chemical Industries, Ltd.), and a predetermined optical pattern was embossed on the surface of the film including the lacquer, and after that, the lacquer was cured. Thus, a film including recessed portions each having such a sectional shape as illustrated in FIG. 6 and such a plan-view shape as illustrated in FIG. 5 was produced. The recessed portions each had a height (depth) H of 10 μm, a width W of 20 μm, an inclination angle θa of its first inclined surface of 30°, and an inclination angle θb of its second inclined surface of 70°. Further, the recessed portions were arranged at a pitch Py in a light guide direction of 100 μm and a pitch Px in a direction perpendicular to the light guide direction of 200 μm.

Example 1

The film produced in Production Example 4 was used as a light extraction layer. The adjacent pressure-sensitive adhesive layer formed in Production Example 2 was arranged on the main surface of the film on which the recessed portions were formed, and a cover sheet (glass sheet, thickness: 5 mm) was laminated thereon via the adjacent pressure-sensitive adhesive layer. Further, the separate pressure-sensitive adhesive layer formed in Production Example 3 was arranged on the main surface of the film on which the recessed portions were prevented from being formed, and a cover sheet (glass sheet, thickness: 5 mm) was laminated thereon via the separate pressure-sensitive adhesive layer. Thus, an optical laminate having the configuration "cover sheet/adjacent pressure-sensitive adhesive layer/(recessed portions)/light extraction layer/separate pressure-sensitive adhesive layer/cover sheet" was produced. The resultant optical laminate was subjected to the above-mentioned evaluations. The results are shown in Table 1.

Example 2

An optical laminate having the configuration "cover sheet/adjacent pressure-sensitive adhesive layer/porous layer/(recessed portions)/light extraction layer/separate pressure-sensitive adhesive layer/cover sheet" was produced in the same manner as in Example 1 except that a porous layer was formed by applying the coating liquid for forming a porous layer of Production Example 1 to the main surface of the light extraction layer on which the recessed portions were formed, and drying the liquid. The porous layer had a thickness of 1 μm and a refractive index of 1.18. The resultant optical laminate was subjected to the same evaluations as those in Example 1. The results are shown in Table 1.

Comparative Example 1

An optical laminate having the configuration "cover sheet/separate pressure-sensitive adhesive layer/(recessed portions)/light extraction layer/separate pressure-sensitive adhesive layer/cover sheet" was produced in the same manner as in Example 1 except that the separate pressure-sensitive adhesive layer formed in Production Example 3 was arranged on the main surface of the light extraction layer on which the recessed portions were formed, that is, the separate pressure-sensitive adhesive layer was arranged in place of the adjacent pressure-sensitive adhesive layer.

The recessed portions of the light extraction layer were each filled with the pressure-sensitive adhesive for forming the separate pressure-sensitive adhesive layer. The resultant optical laminate was subjected to the same evaluations as those in Example 1. The results are shown in Table 1.

TABLE 1

|  | Example 1 | Example 2 | Comparative Example 1 |
|---|---|---|---|
| Configuration | Cover sheet<br>Separate pressure-sensitive adhesive layer<br>Light extraction layer (Recessed portions)<br>Adjacent pressure-sensitive adhesive layer<br>Cover sheet | Cover sheet<br>Separate pressure-sensitive adhesive layer<br>Light extraction layer (Recessed portions)<br>Porous layer<br>Adjacent pressure-sensitive adhesive layer<br>Cover sheet | Cover sheet<br>Separate pressure-sensitive adhesive layer<br>Light extraction layer (Recessed portions)<br>Separate pressure-sensitive adhesive layer<br>Cover sheet |
| Refractive index in the vicinity of recessed portions | 1.00 | 1.18 | 1.48 (Filled with pressure-sensitive adhesive) |
| Maximum brightness (Cd/m$^2$) | 367 | 335 | 5 |

As is apparent from Table 1, it is found that, according to each of Examples of the present invention, the optical laminate having an excellent light extraction function can be achieved by arranging the region having a low refractive index in the vicinity of the recessed portions of the light extraction layer.

INDUSTRIAL APPLICABILITY

The optical laminate according to each of the embodiments of the present invention can be suitably used in applications in which a design property is imparted to a product (e.g., surface lighting and expression of a specific design through patterning).

REFERENCE SIGNS LIST

10 light extraction layer
10a first main surface
10b second main surface
12 light extraction mechanism
12a recessed portion
21 first pressure-sensitive adhesive layer
22 second pressure-sensitive adhesive layer
23 third pressure-sensitive adhesive layer
region having low refractive index (porous layer or recessed portion)
100 optical laminate
101 optical laminate
102 optical laminate
103 optical laminate

The invention claimed is:

1. An optical laminate, comprising:
a light extraction layer having a first main surface and a second main surface, and having a light extraction mechanism including a recessed portion arranged on any one of the first main surface or the second main surface;
a first cover sheet laminated via a first pressure-sensitive adhesive layer on a main surface side of the light extraction layer on which the light extraction mechanism is arranged; and
a second cover sheet laminated via a second pressure-sensitive adhesive layer on a main surface side of the light extraction layer on which the light extraction mechanism is prevented from being arranged,
wherein the optical laminate has a region having a refractive index lower than a refractive index of the first pressure-sensitive adhesive layer or the second pressure-sensitive adhesive layer arranged on any one of a first main surface side or a second main surface side of the light extraction layer; and
wherein each of the first cover sheet and the second cover sheet is devoid of any light extraction mechanism that includes a recessed portion.

2. The optical laminate according to claim 1, wherein the region is an air portion defined by the recessed portion of the light extraction mechanism and the first pressure-sensitive adhesive layer.

3. The optical laminate according to claim 2, wherein the first pressure-sensitive adhesive layer includes a pressure-sensitive adhesive having a storage modulus of elasticity of $1.0 \times 10^5$ (Pa) or more.

4. The optical laminate according to claim 1,
wherein the first pressure-sensitive adhesive layer or the second pressure-sensitive adhesive layer includes a patterned pressure-sensitive adhesive, and
wherein the region is an air portion defined by a portion in which the pressure-sensitive adhesive is prevented from being arranged.

5. The optical laminate according to claim 1,
wherein the optical laminate has a porous layer having a refractive index of less than 1.20 formed between the light extraction layer and the first pressure-sensitive adhesive layer or the second pressure-sensitive adhesive layer, and
wherein the region is the porous layer.

6. The optical laminate according to claim 5, wherein the porous layer is formed directly on a surface of the recessed portion of the light extraction mechanism.

7. The optical laminate according to claim 5, wherein the porous layer has a haze of less than 5%.

8. The optical laminate according to claim 5, wherein the porous layer has a thickness of 5 μm or less.

9. The optical laminate according to claim 5,
wherein the porous layer is formed of one or a plurality of kinds of constituent units each forming a fine pore structure, and
wherein the constituent units are chemically bonded to each other through a catalytic action.

10. The optical laminate according to claim 9, wherein the constituent units of the porous layer are each a constituent unit having at least one shape selected from the group consisting of: a particle shape; a fiber shape; a rod shape; and a flat plate shape.

11. The optical laminate according to claim 9, wherein a bond between the constituent units of the porous layer includes a hydrogen bond or a covalent bond.

12. The optical laminate according to claim 1, wherein any one of the first cover sheet or the second cover sheet functions as a light guide plate.

13. An optical laminate, comprising:
a light extraction layer having a first main surface and a second main surface, and having a light extraction mechanism including a recessed portion arranged on the first main surface;
a first cover sheet laminated via a first pressure-sensitive adhesive layer on the first main surface side of the light extraction layer on which the light extraction mechanism is arranged; and
a second cover sheet laminated via a second pressure-sensitive adhesive layer on the second main surface side of the light extraction layer on which the light extraction mechanism is prevented from being arranged,
wherein the first pressure-sensitive adhesive layer includes a pressure-sensitive adhesive having a storage modulus of elasticity of $1.0 \times 10^5$ (Pa) or more, and the second pressure-sensitive adhesive layer includes a pressure-sensitive adhesive having a storage modulus of elasticity of $8.5 \times 10^4$ (Pa) or less,
wherein the optical laminate has a region having a refractive index lower than a refractive index of the first pressure-sensitive adhesive layer arranged on the first main surface side of the light extraction layer, and
wherein the region is an air portion defined by the recessed portion of the light extraction mechanism and the first pressure-sensitive adhesive layer.

14. The optical laminate according to claim 13, wherein the optical laminate has a porous layer having a refractive index of less than 1.20 formed directly on a surface of the recessed portion of the light extraction mechanism.

* * * * *